(12) United States Patent
Antonuk et al.

(10) Patent No.: US 7,577,596 B2
(45) Date of Patent: Aug. 18, 2009

(54) MARKING AN ITEM WITH AN EXPIRATION DATE

(75) Inventors: Larry Antonuk, Marlborough, NH (US); Chris Sullivan, Keene, NH (US)

(73) Assignee: Markem-Imaje Corporation, Keene, NH (US)

( * ) Notice: Subject to any disclaimer, the term of this patent is extended or adjusted under 35 U.S.C. 154(b) by 163 days.

(21) Appl. No.: 11/688,717

(22) Filed: Mar. 20, 2007

(65) Prior Publication Data

US 2008/0234853 A1 Sep. 25, 2008

(51) Int. Cl.
G06Q 10/00 (2006.01)
G06F 19/00 (2006.01)

(52) U.S. Cl. .................. 705/28; 235/385; 340/5.92

(58) Field of Classification Search .................. 700/115, 700/213, 215, 219, 221, 225, 228, 230; D09/414; 705/22, 28; 235/385; 340/5.92, 10.51, 572.1
See application file for complete search history.

(56) References Cited

U.S. PATENT DOCUMENTS

| | | | |
|---|---|---|---|
| 5,388,384 A | 2/1995 | Purkey et al. | |
| 6,327,576 B1 * | 12/2001 | Ogasawara | 705/22 |
| 6,483,473 B1 * | 11/2002 | King et al. | 343/767 |
| 6,712,276 B1 * | 3/2004 | Abali et al. | 235/492 |
| 6,961,000 B2 * | 11/2005 | Chung | 340/572.1 |
| 6,982,640 B2 * | 1/2006 | Lindsay et al. | 340/540 |
| 7,309,000 B2 * | 12/2007 | McDonald | 235/375 |
| 2005/0141256 A1 * | 6/2005 | Yamazaki et al. | 365/96 |
| 2007/0221727 A1 * | 9/2007 | Reznik | 235/383 |
| 2007/0235528 A1 * | 10/2007 | Spencer et al. | 235/383 |
| 2007/0258221 A1 * | 11/2007 | Koyama et al. | 361/737 |
| 2008/0046114 A1 * | 2/2008 | White et al. | 700/215 |

FOREIGN PATENT DOCUMENTS

WO WO2007/022804 A1 3/2007

* cited by examiner

Primary Examiner—Charles R Kasenge
(74) Attorney, Agent, or Firm—Fish & Richardson P.C.

(57) ABSTRACT

A method for marking items includes determining production-date information indicative of a production date associated with an item; at least in part on the basis of the production-date information, determining a production-date range corresponding to the production-date information; retrieving expiration-date information corresponding to the production-date information; and marking the item with a mark representative of the expiration-date information.

19 Claims, 4 Drawing Sheets

MARKING AN ITEM WITH AN EXPIRATION DATE

FIELD OF DISCLOSURE

This disclosure relates to marking items, and in particular, with marking an item with information that may change from one item to the next.

BACKGROUND

Many packaged items, particularly foods, have a finite shelf life. Since one cannot easily inspect the contents of an item through its packaging, it is customary to estimate when the item might reach the end of its shelf life, and to then print a corresponding expiration date on the item.

Mass-produced items are typically produced at different times. Since such items would normally have similar shelf lives, it follows that the expiration date to be printed on each item will vary with the production date of that item. In many cases, one obtains the expiration date by adding a fixed offset to the production date. However, more complex rules are sometimes used.

In general, the expiration date can be regarded as a function of the production date. Conventional marking devices typically determine the production date of an item, and then calculate the corresponding expiration date. This procedure is computationally intensive. Moreover, a marking machine is often used for different types of items, all of which have different rules for determining an expiration date.

SUMMARY

In one aspect, the invention features an apparatus for marking items in a production line. Such an apparatus includes: a marker for marking an item; a conveyor for conveying items toward the marker; a data-storage medium having stored thereon expiration information indicative of an expiration date that corresponds to a production-date range; and a processor in data communication with the marker and with the data storage medium. The processor is configured to receive production-date information associated with an item, to identify a production-date range corresponding to the production-date information; to retrieve from the data-storage medium, expiration-date information that corresponds to the production-date range, and to cause the marker to mark the item with a mark representative of the expiration-date information.

Embodiments include those in which the marker includes a printer, and those in which the marker includes an RFID encoder.

Other embodiments include those in which the production-date range spans a plurality of production dates, and those in which the production-date range spans one production date.

Additional embodiments include those in which the expiration-date information indicates that, for all production dates, an offset between the production date and an expiration date corresponding to the production date is independent of the production date, and those in which the expiration-date information indicates that all production dates within a particular production-date interval have the same expiration date.

In some embodiments, the processor is further configured to receive item-type information indicative of an item type. In some of these embodiments, the expiration-date information includes information corresponding to each of a plurality of item types.

Other embodiments include those in which the data-storage medium stores a calendar table having expiration-date information corresponding to each of a plurality of production-date ranges, those in which the data-storage medium stores a calendar table having a row corresponding to each of a plurality of production-date ranges, each row including an expiration date associated with a particular production-date range, those in which the data storage medium stores a calendar table having a separate expiration date for each production date, and those in which the data-storage medium stores a plurality of calendar tables, each of which includes expiration-date information for a particular item type.

In some embodiments, the processor is configured to cause the marker to mark the item with a mark representative of the expiration-date information, the mark being an encrypted form of the expiration-date information.

Other embodiments also include a system clock for providing production-date information to the processor.

In another aspect, the invention features a method for marking items such a method includes: determining production-date information indicative of a production date associated with an item; at least in part on the basis of the production-date information, determining a production-date range corresponding to the production-date information; retrieving expiration-date information corresponding to the production-date information; and marking the item with a mark representative of the expiration-date information.

Practices of the invention also include those in which determining a production-date range includes identifying a production-date range that spans a plurality of production dates, and those in which determining a production-date range includes identifying a production-date range that spans a single production date.

Other practices of the invention include those in which marking includes printing, on the item, a mark representative of the expiration-date information, and those in which marking includes encoding, on an RFID tag associated with the item, data representative of the expiration-date information.

In some practices, determining production-date information includes determining a date from a system clock.

Additional practices include those in which retrieving expiration-date information includes accessing a calendar table containing, for each of a plurality of production-date ranges, an expiration date corresponding to the production-date range, and those in which retrieving expiration-date information includes accessing a calendar table containing, for each production date, a corresponding expiration date.

In another aspect, the invention feature a computer-readable medium having encoded thereon software for executing any of the foregoing methods.

The details of one or more embodiments of the invention are set forth in the accompanying drawings and the description below. Other features, objects, and advantages of the invention will be apparent from the claims, the description, and its accompanying drawings, in which:

DETAILED DESCRIPTION

Figure 1:
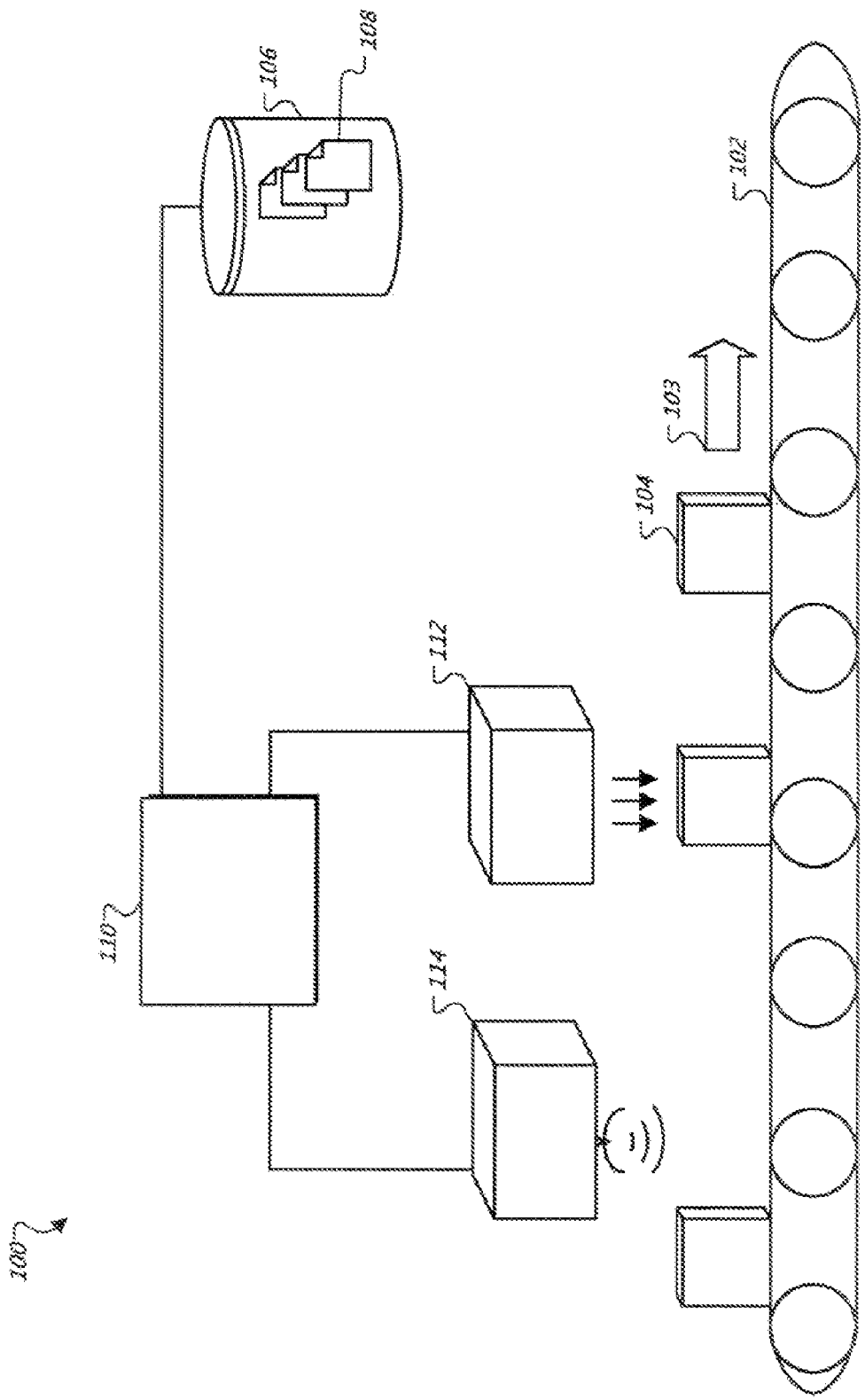
FIG. 1 is a block diagram schematically showing an apparatus for marking an expiration date on items.

FIG. 1 shows an apparatus 100 for marking an expiration date on items. The term "expiration date" is not intended to mean a date on which an item becomes unusable. As is well known, many items remain usable past their marked expiration date, and many other items, in some cases because of improper storage, become unusable prior to their marked expiration date. Instead, "expiration date" is intended to mean a date that defines the end of an item's life cycle.

As used herein, "item" is not limited to a single physical object, but can include a collection of such objects. The collection of objects can be heterogeneous or homogeneous. For example, a case of beer could be an "item" even though the case includes numerous individual bottles.

A marking apparatus 100, as shown in FIG. 1, can mark the item with a human-readable expiration date. For example, the expiration date can be printed using an international date format (e.g., 2008-1-1). Alternatively, the apparatus 100 can mark the item with a machine-readable expiration date. For example, the expiration date can he marked by RF encoding an RFID tag, or by printing a bar code. Moreover, in certain implementations, the apparatus 100 can mark the item using combinations thereof. The apparatus 100 can also mark an item with an encrypted expiration date. As used herein, the term "mark" is not restricted to visible marks or human-readable marks. Exemplary marks include human-readable text, data encoded in an RFID tag, and bar codes.

In certain implementations, an expiration date can be marked on a container that has yet to be filled with a product. For example, potato chip bags can be marked prior to being filled with potato chips.

Referring to FIG. 1, the apparatus 100 includes a product conveyor 102 that moves items in a direction illustrated by arrow 103. The apparatus 100 also includes a storage medium 106 to store information relating to expiration dates. For example, the storage medium 106 can store one or more calendar tables 108, each of which specifies, for a particular type of item, the expiration dates corresponding to production-date ranges. Examples of storage media include, but are not limited to, a floppy disk, a hard drive, a CD-ROM, and a DVD-ROM. As used herein, "date range" is intended to mean an integer number of consecutive dates and can consist of one date or multiple consecutive dates.

The calendar tables 108 are generated using programmable rules. Exemplary rules include those that add an offset to a production date, and those that set the expiration date to be the closest one of a finite set of dates. For example, a rule can add seven days to the production date, or a rule can round the expiration date to the next upcoming Saturday. These rules will be referred to herein as "offset rules" and "rounding rules" respectively. Moreover, the data tables 108 can be generated by first applying a rounding rule and then applying an offset rule, or by first applying an offset rule and then applying a rounding rule. The existence of a rounding rule means that it is possible for all dates within a range of production dates to map to the same expiration date. For example, the expiration date for all items having a production date between Nov. 22, 2007 and Nov. 25, 2007 can be mapped to the same expiration date of Nov. 29, 2007. The term "production date" is not intended to mean the date on which an item was actually produced. Such a meaning would be ambiguous since it is often difficult to identify the exact moment of production. Instead, "production date" is intended to mean a date that marks the beginning of an item's life cycle. For many applications, it is convenient to set the "production date" to be the date on which the item was marked.

A processor 110 accesses the storage medium 106 to read calendar tables 108 stored therein. In addition, the processor 110 receives inputs specifying the production-date ranges. For example, a user-interface can solicit such information and provide it to the processor 110, another processor can transmit the production-date ranges to the processor 110, or the processor 110 can access the production-date ranges from a storage device, or some combination thereof. The processor 110 also periodically obtains production-date information, such as a system time from a system clock, and uses that system lime to derive a production date for an item. For example, when a system clock provides production-date information the production date of an item is the date on which it is marked. The processor 110 then determines the particular production-date range that includes the production date and uses that production-date range to index a calendar table 108 of expiration-date information. The processor 110 then retrieves the corresponding expiration-date information and uses that to derive an expiration date for marking items. For example, the processor 110 can communicate with a printing device 112, an RFID encoder 114, or some combination thereof to mark items with a mark representative of expiration-date information retrieved from a calendar table 108.

The printing device 112 can mark the items with images. The printed images can have variable width and variable height. The image can include one or more fields that contain specified information obtained from a marking-information table 200, shown in FIG. 2. For example, one field might show an expiration date, another might show a shipping address, and another might show a price. There are many ways to represent the information in each field. For example, an expiration date can be represented as "2008-12-31" or as "2008-365," "08-L-BE," "53-G-2008," or other representations.

As used herein, "date" is intended to identify a time interval. The term "date" is not restricted to mean a 24-hour time interval that corresponds to a calendar day. For example, "January 2006" would be a "date" because it defines a time-interval that encompasses thirty-one calendar days. The time-interval defined by a date need not be an integer-multiple of a twenty-four hour period, and can in fact be a fraction of a twenty-four hour period.

In certain implementations, the image can include company logos, text, lines and geometric shapes (e.g., squares and ellipses), and other non-textual information.

Figure 2:
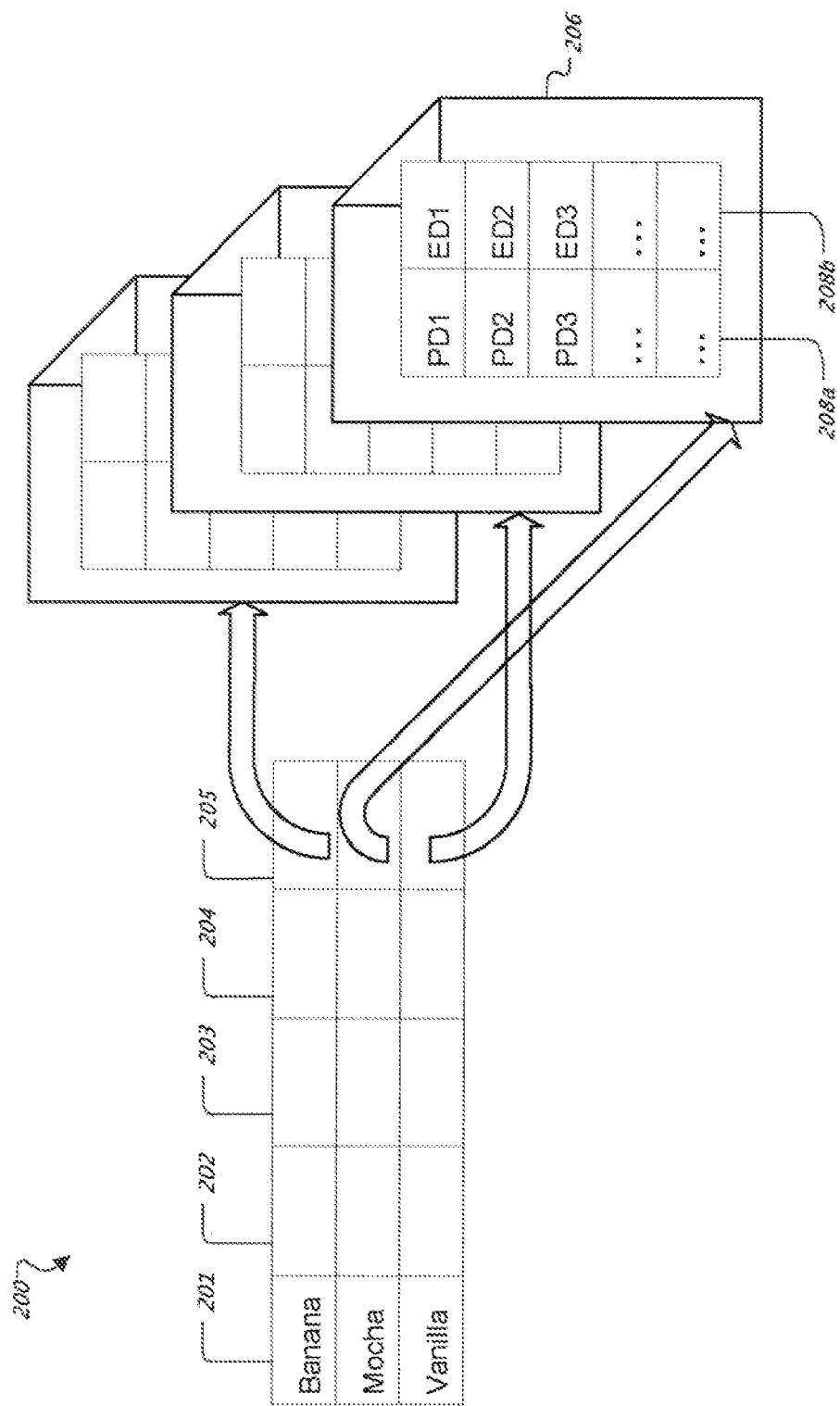
FIG. 2 is a block diagram showing a data structure for accessing a calendar table.

FIG. 2 illustrates directly accessing expiration-date information from the calendar tables 108. For example, the apparatus 100 can use a received production-date range corresponding to a production date to access expiration-date information stored in a calendar table 206. A mark-information table 200 includes an ID column 201 that specifies the identity of the item, and additional columns that specify information to be included in the mark. An ID column 201 specifies a name (e.g., "Banana," or "Mocha," or "Vanilla"), or another representation such as a number (e.g., 210759, or 611295, or 999999), or a combination thereof to identify an item. In certain implementations, the ID column 201 can include an abbreviation of a name such as "bana," or "moch" or "vani," or a combination of an abbreviated name and a number.

Among the columns of the mark-information table 200 is an expiration column 205 that stores a pointer to a specific entry in a calendar table. The apparatus 100 uses the specific calendar table entry referenced by the pointer stored in the expiration column 205 to retrieve expiration-date information. For example, the calendar table 206 includes a range column 208a and an expiration column 208b. The range column 208a includes production-date ranges PD1, PD2, PD3, etc. These production-date ranges correspond to expiration-date information stored in the expiration column 208b. For example, production-date ranges PD1, PD2, and PD3 correspond to expiration-date information ED1, ED2, and ED3 stored in the expiration column 208b, respectively.

In certain implementations, the mark-information table 200 includes additional columns 202, 203 and 205 for storing additional information, to be included when marking an item. Examples of such additional information include a price, an encrypted name, an expanded name, or other information. For example, the processor 110 can print the price and expiration date in predetermined fields of an image using a printer, or encode that information in predetermined fields in a RFID tag using an RFID encoder.

In certain implementations, the information stored in the calendar tables 108 is automatically checked, or updated, or both, either periodically or asynchronously. Moreover, the information stored in the calendar tables 108, or in the mark-information table 200 can be modified by the processor 110, or by another system. For example, a calendar-modifying application that includes a user-interface can be used to update and/or store the information in the calendar table 206.

Figure 3:
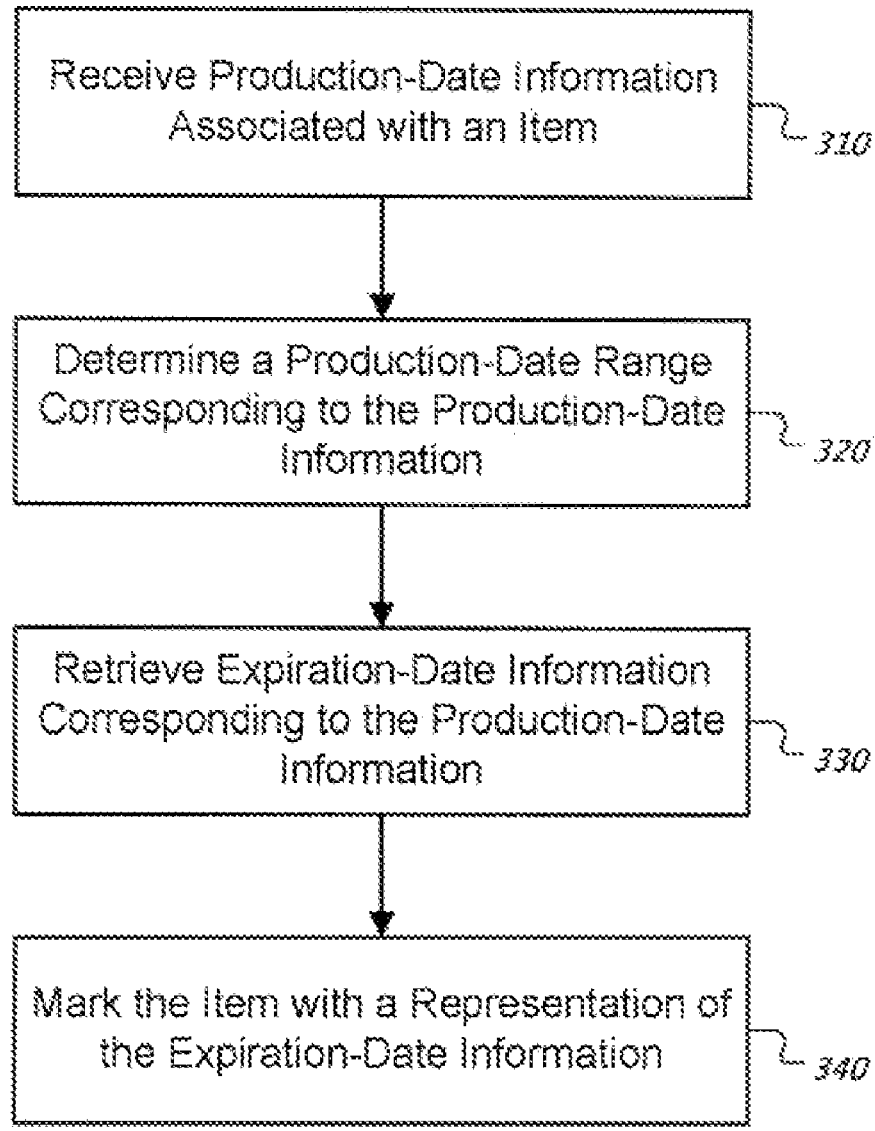
FIG. 3 is a flow chart showing a method for printing an expiration date on items.

FIG. 3 is a flow chart showing a method 300 for printing expiration dates on items. The method 300 begins with the receipt of production-date information for an item (step 310). For example, the processor 110 can receive a production date from a system clock.

The processor 110 then identifies a production-date range corresponding to the production-date information (step 320). For example, the processor 110 can apply rounding rules or offset rules, or combinations thereof to the received production-date information to determine the production-date range.

Then, the processor 110 identifies an expiration date that corresponds to the specified production-date range (step 330). For example, the processor 110 can access the storage medium 106 and retrieve expiration-date information from the calendar table 108.

Finally, the item is marked with information representative of the expiration date (step 340). For example, the processor 110 can transmit the expiration-date information to the RF encoder 114, or to the printer 112, or both. The RF encoder 114 or the printer 112 can then mark the item with a representation of the expiration date. For example, the RF encoder 114 can digitally encode an RF tag with the expiration date and the printer 112 can print images with various representations of the expiration date (e.g., as described previously in reference to FIG. 1).

Figure 4:
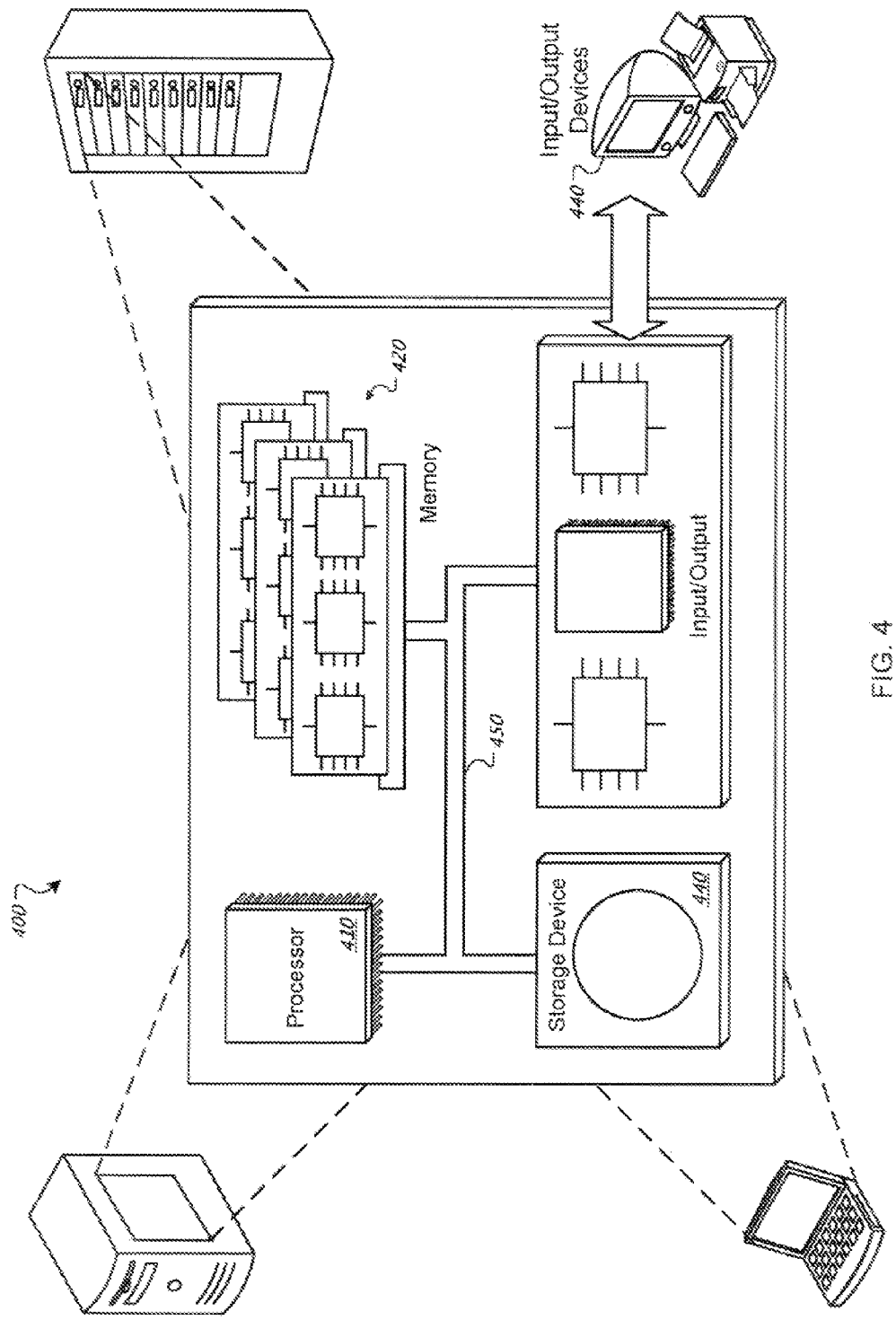
FIG. 4 is a block diagram of a computing system used in connection with computer-implemented methods described herein; and Like reference symbols in the various drawings indicate like elements.

FIG. 4 shows a generic computer system 400 for implementing the operations described in association with any of the computer-implement methods described previously. The system 400 includes a processor 410, a memory 420, a storage device 430, and an input/output device 440. The components 410, 420, 430, and 440 are interconnected using a system bus 350. The processor 410 is capable of processing machine instructions for executing the methods described herein. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. An apparatus for marking items in a production line, the apparatus comprising:
   a marker for marking an item;
   a data-storage medium having stored thereon expiration information indicative of an expiration date that corresponds to a production-date range; and
   a processor in data communication with the marker and with the data storage medium, the processor being configured
      to receive production-date information associated with an item,
      to identify a production-date range corresponding to the production-date information;
      to retrieve from the data-storage medium, expiration-date information that corresponds to the production-date information and the production-date range, and
      to cause the marker to mark the item with a mark representative of the expiration-date information;
      wherein the production-date range spans a plurality of production dates; and
      wherein retrieving expiration-date information comprises accessing a calendar table containing, for each of a plurality of production-date ranges, an expiration date corresponding to the production-date range.

2. The apparatus of claim 1, wherein the marker comprises a printer.

3. The apparatus of claim 1, wherein the marker comprises an RFID encoder.

4. The apparatus of claim 1, wherein the expiration-date information indicates that, for all production dates, an offset between the production date and an expiration date corresponding to the production date is independent of the production date.

5. The apparatus of claim 1, wherein the expiration-date information indicates that all production dates within a particular production-date interval have the same expiration date.

6. The apparatus of claim 1, wherein the processor is further configured to receive item-type information indicative of an item type.

7. The apparatus of claim 6, wherein the expiration-date information comprises information corresponding to each of a plurality of item types.

8. The apparatus of claim 1, wherein the data-storage medium stores the calendar table, the calendar table having a row corresponding to each of the plurality of production-date ranges, each row including an expiration date associated with a particular production-date range.

9. The apparatus of claim 1, wherein the data-storage medium stores a plurality of calendar tables, each of which includes expiration-date information for a particular item type.

10. The apparatus of claim 1, wherein the processor is configured to cause the marker to mark the item with a mark representative of the expiration-date information, the mark being an encrypted form of the expiration-date information.

11. The apparatus of claim 1, further comprising a system clock for providing production-date information to the processor.

12. A method for marking items, the method comprising: determining production-date information indicative of a production date associated with an item;
   at least in part on the basis of the production-date information, determining a production-date range corresponding to the production-date information;
   retrieving expiration-date information corresponding to the production-date information and the production-date range; and
   marking the item with a mark representative of the expiration-date information;
   wherein determining a production-date range comprises identifying a production-date range that spans a plurality of production dates; and
   wherein retrieving expiration-date information comprises accessing a calendar table containing, for each of a plurality of production-date ranges, an expiration date corresponding to the production-date range.

13. The method of claim 12, wherein marking comprises printing, on the item, a mark representative of the expiration-date information.

14. The method of claim 12, wherein marking comprises encoding, on an RFID tag associated with the item, data representative of the expiration-date information.

15. The method of claim 12, wherein determining production-date information comprises determining a date from a system clock.

16. A computer-readable medium having encoded thereon software for marking items, the software comprising instructions for:
   determining production-date information indicative of a production date associated with an item;
   at least in part on the basis of the production-date information, determining a production-date range corresponding to the production-date information and the production-date range;
   retrieving expiration-date information corresponding to the production-date information; and
   marking the item with a mark representative of the expiration-date information;
   wherein determining a production-date range comprise identifying a production-date range that spans a plurality of production dates; and
   wherein retrieving expiration-date information comprises accessing a calendar table containing, for each of a plurality of production-date ranges, an expiration date corresponding to the production-date range.

17. The computer-readable medium of claim 16, wherein the instructions for marking comprise instructions for printing, on the item, a mark representative of the expiration-date information.

18. The computer-readable medium of claim 16, wherein the instructions for marking comprise instructions for encoding, on an RFID tag associated with the item, data representative of the expiration-date information.

19. The computer-readable medium of claim 16, wherein the instructions for determining production-date information comprise instructions for determining a date from a system clock.

* * * * *